US010329719B1

(12) United States Patent
Giles

(10) Patent No.: US 10,329,719 B1
(45) Date of Patent: Jun. 25, 2019

(54) COMPOSITION AND METHOD FOR SURFACE REPAIR

(71) Applicant: Richard P Giles, Park City, UT (US)

(72) Inventor: Richard P Giles, Park City, UT (US)

( * ) Notice: Subject to any disclaimer, the term of this patent is extended or adjusted under 35 U.S.C. 154(b) by 0 days.

(21) Appl. No.: 15/990,801

(22) Filed: May 28, 2018

(51) Int. Cl.
*E01C 11/00* (2006.01)
*E01C 7/30* (2006.01)
*E01C 19/10* (2006.01)
*E01C 7/35* (2006.01)
*E01C 7/14* (2006.01)
*C04B 26/02* (2006.01)
*C04B 18/08* (2006.01)
*C04B 14/06* (2006.01)
*C04B 111/00* (2006.01)

(52) U.S. Cl.
CPC ............ *E01C 11/005* (2013.01); *C04B 14/06* (2013.01); *C04B 18/08* (2013.01); *C04B 26/02* (2013.01); *E01C 7/142* (2013.01); *E01C 7/147* (2013.01); *E01C 7/30* (2013.01); *E01C 7/35* (2013.01); *E01C 19/10* (2013.01); *C04B 2111/0075* (2013.01)

(58) Field of Classification Search
CPC ......... C04B 28/02; C04B 14/06; C04B 14/42; C04B 22/124; E01C 11/005
See application file for complete search history.

(56) References Cited

U.S. PATENT DOCUMENTS

| | | |
|---|---|---|
| 1,707,391 A | 4/1929 | Vern |
| 3,284,390 A | 11/1966 | Scheibli |
| 3,486,626 A | 1/1970 | Rubenstein |
| 3,853,417 A | 12/1974 | Olsson |
| 3,870,422 A * | 3/1975 | Medico, Jr. ............... E01C 3/00 404/31 |
| 4,113,401 A * | 9/1978 | McDonald .............. E01C 7/187 404/75 |
| 4,402,749 A * | 9/1983 | Hall ........................ C04B 28/26 106/606 |
| 4,507,013 A | 3/1985 | Martinak |
| 4,627,998 A | 12/1986 | Akihama |
| 4,668,548 A | 5/1987 | Lankard |
| 4,915,539 A * | 4/1990 | Yoshikane .............. C04B 28/02 404/31 |
| 4,968,101 A | 11/1990 | Bossow |
| 5,290,123 A * | 3/1994 | Barnes ................ E01C 19/1072 106/283 |
| 5,476,340 A | 12/1995 | Contrasto |
| 5,494,741 A | 2/1996 | Fekete |
| 5,749,674 A * | 5/1998 | Wilson, Sr. ............. E01C 7/187 404/75 |
| 5,829,914 A | 11/1998 | Wells |
| 5,947,634 A | 9/1999 | Robillard |

(Continued)

FOREIGN PATENT DOCUMENTS

WO    WO9511120    4/1995

*Primary Examiner* — Abigail A Risic
(74) *Attorney, Agent, or Firm* — Brett J. Davis; TechLaw Ventures, PLLC

(57) ABSTRACT

A composition and method of repairing damaged concrete and asphalt surfaces includes a two-part polymer resin mixture. To effectuate a repair, the damaged portion is cleaned of debris and loose pieces. The two-part polymer resin mixture is mixed onsite and is applied as a protective overlay over the damaged portion. Once cured, the mixture provides a protective layer over the damaged area.

16 Claims, 18 Drawing Sheets

(56) References Cited

U.S. PATENT DOCUMENTS

| | | | |
|---|---|---|---|
| 6,052,964 A | 4/2000 | Ferm | |
| 7,686,536 B2 | 3/2010 | Hall | |
| 7,712,996 B2 | 5/2010 | Hall | |
| 2002/0009622 A1* | 1/2002 | Goodson | B32B 13/00 |
| | | | 428/703 |
| 2004/0116557 A1 | 6/2004 | Pounds | |
| 2009/0117265 A1* | 5/2009 | Fosnacht | C04B 28/34 |
| | | | 427/140 |
| 2010/0075029 A1* | 3/2010 | Wilson, Jr. | C04B 28/04 |
| | | | 427/138 |
| 2014/0115975 A1 | 5/2014 | Bussio | |
| 2014/0137508 A1 | 5/2014 | Bussio | |
| 2014/0261771 A1 | 9/2014 | Bussio | |
| 2014/0369749 A1* | 12/2014 | Friedman | C08K 11/00 |
| | | | 404/72 |
| 2016/0160456 A1* | 6/2016 | Bullivant | E01C 7/187 |
| | | | 404/32 |
| 2016/0376781 A1 | 12/2016 | Bussio | |
| 2018/0087283 A1 | 3/2018 | Bussio | |

* cited by examiner

COMPOSITION AND METHOD FOR SURFACE REPAIR

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

1. The Field of the Invention

The present invention relates generally to roadways, and more particularly, but not necessarily entirely, to the repair and maintenance of roadways.

2. Description of Related Art

The repair and maintenance of roadways is a costly and time-consuming endeavor. Pothole repair is particularly vexing as repairs tend to fail within a relatively short period of time making additional repairs necessary. Typical pothole repair includes the placement of a sufficient amount of a fill material into the pothole. For example, in the case of a pothole formed in an asphalt roadway, replacement asphalt-type material may be used to repair the pothole. In the case of a pothole formed in a concrete roadway, replacement concrete-type material may be used to repair the pothole.

As mentioned, pothole repairs tend to fail in relatively short amounts of time. Repair failure may be due to several reasons, the primary of which is that the repair material may not properly bond to the adjacent cured roadway. In some instances, the interface between the cured roadway adjacent the pothole and the repair material is porous such that moisture seeps into the repaired pothole. The moisture may lead to further erosion and damage in areas that have a freeze-thaw cycle. Further, automobile traffic may cause the formation of cracks at the repair-roadway interface that spread deep into the fill material. Such cracks may eventually lead to fragmenting of the fill material. It would be an advantage over the prior art to provide an improved repair method and system for repairing a pothole in a roadway.

The prior art is thus characterized by several disadvantages that are addressed by the present invention. The present invention minimizes, and in some respects eliminates, the above-mentioned failures, and other problems, by utilizing the methods and structural features described herein. The features and advantages of the invention will be set forth in the description which follows, and in part will be apparent from the description, or may be learned by the practice of the invention without undue experimentation. The features and advantages of the invention may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
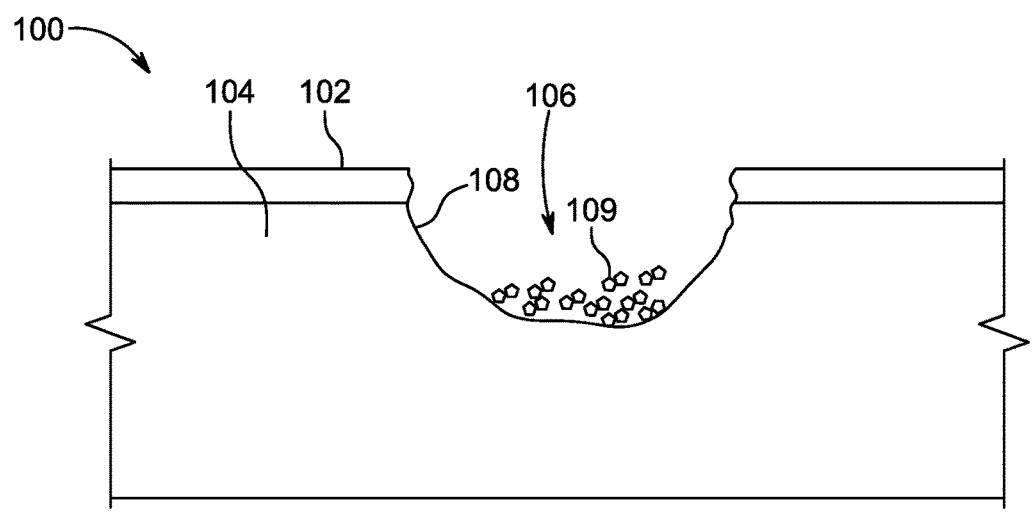
FIG. 1 depicts a pothole in a roadway identified for repair according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "containing," "having," "characterized by," and grammatical equivalents thereof are inclusive or open-ended terms that do not exclude additional, unrecited elements or method steps. As used herein, the term "about" means within 20% higher or lower than the stated value.

As used herein, the term "roadway" may refer to surfaces formed from asphalt or concrete and includes asphalt and concrete surfaces intended for all types of wheeled vehicles, including automobiles, bicycles, airplanes and the like. The term "roadway" may also refer to footpaths, trails and other surfaces intended for pedestrian traffic. The term "roadway" may include roads, highways, freeways, bridges, pathways, trails, parking lots, runways, sidewalks and the like.

The present disclosure is directed to a novel system and method for improved roadway repair. The present disclosure may be particularly suited for repairing damaged portions of roadways. As used herein, the term "damaged portion," when used in reference to a roadway, may include potholes, cracks, voids, partially broken areas, scrapes, worn portions, and any other type of damage that occurs to roadways. The damaged portion may be caused by traffic and weather.

In an embodiment, the present disclosure provides a fill material with improved durability and life as compared to previous repair materials and methods.

In an embodiment, a method for repair of a roadway comprises clearing the damaged portion of loose debris. Boreholes are then formed in the interior surface of the damaged portion. One or more of the boreholes may undercut the non-damaged portion of the roadway. The boreholes may have a diameter between one-half inch and three inches. A depth of the boreholes may range from about six inches to three feet. The boreholes may be formed using a handheld or machine mounted drill having an auger type bit. The number of boreholes formed in the pothole may depend on the size of the pothole. In an embodiment, the number of boreholes may range from one to twenty. In an embodiment, the number of boreholes is two.

Once the boreholes are formed, a fill material may be placed into the damaged portion. The fill material may have a consistency such that it travels to the bottom of the boreholes. The fill material may be even with a top surface of a surface layer of the roadway. In an embodiment, the fill material may comprise a resin. In an embodiment, the fill material may comprise a resin and aggregate mixture. Suitable resins may include polymer-based resins. Once the fill material has been placed into the damaged portion, a friction enhancing topcoat may be installed onto the top of the fill material. In an embodiment, a pigment may be added to the fill material to match the color of the roadway.

Aspects of the present disclosure contemplate using a quartz aggregate in the fill material. The quartz aggregate may be washed and kiln dried. In an embodiment, the quartz aggregate may include at least six fracture faces or sides. In an embodiment, the quartz aggregate may be a mixture of different sizes of quartz. For example, the quartz aggregate may include a mixture of #6 an #12 sized quartz aggregate. In an embodiment, the quartz aggregate is ⅜ of an inch. In an embodiment, the aggregate may include sand. In an embodiment, the aggregate may further include sand and quartz aggregate.

Referring now to FIG. 1, there is depicted a roadway 100 according to an embodiment of the present disclosure. The roadway 100 may be formed of any suitable material. The roadway 100 may include a surface layer 102 formed on a base material 104 as is known to those of ordinary skill. The surface layer 102 may be formed of any suitable material, including, but not limited to, asphalt or concrete. The base material 104 may be formed of aggregate or some other crushed material, such as crushed stone.

A damaged portion 106 may be formed in the roadway 100. The damaged portion 106 may be caused by several factors, including the wear and tear of traffic as well as seasonal freeze-thaw cycles. The damaged portion 106 may take any shape or form, including cracks or other types of damage in the roadway 100. The damaged portion 106 may have an interior surface 108 that defines a cavity or void that extends below the surface layer 102 and into the base material 104. Loose debris 109 may be present in the bottom of the damaged portion 106. The loose debris 109 may include fragmented pieces of the surface layer 102.

Figure 2:
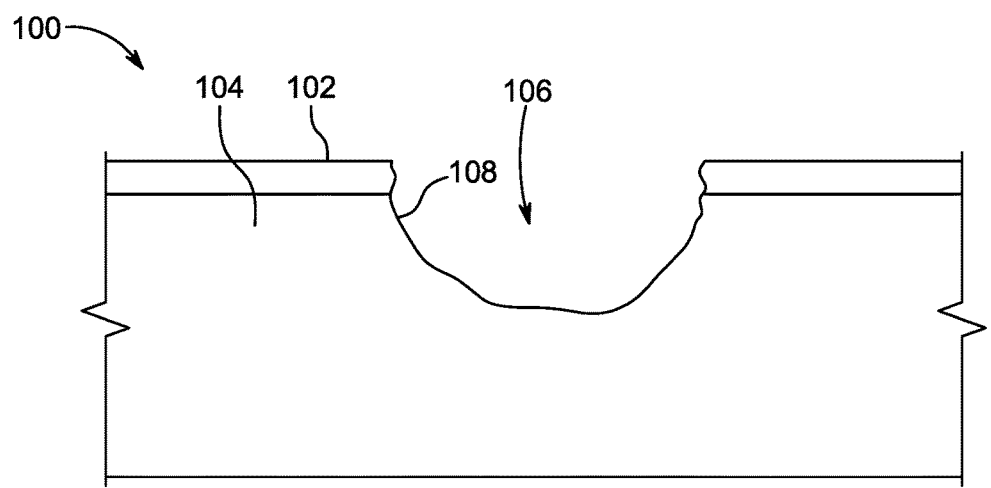
FIG. 2 depicts the pothole in FIG. 1 with the debris removed.

As shown in FIG. 2, where like reference numerals depict like components, the first step in patching the damaged portion 106 is to remove the loose debris to expose the interior surface 108. This may be done using handheld or powered tools, including shovels.

Figure 3:
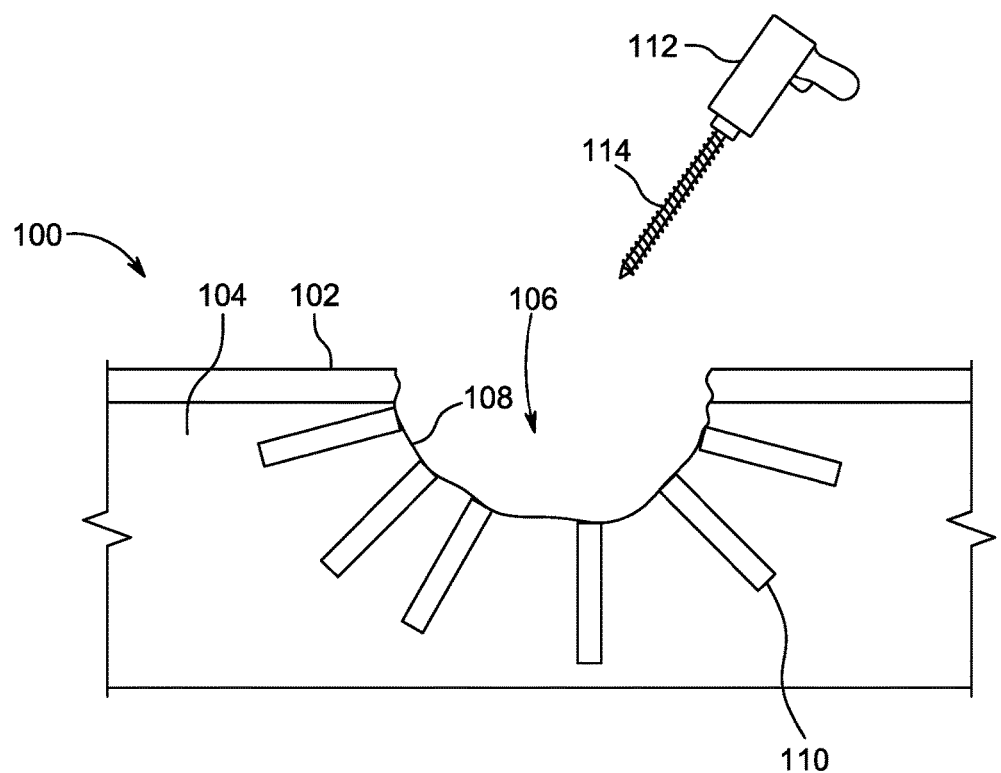
FIG. 3 depicts the pothole in FIG. 1 with the boreholes formed in the interior surface.

As shown in FIG. 3, where like reference numerals depict like components, the next step in patching the damaged portion 106 is to form at least one borehole 110 in the interior surface 108. In an embodiment, the at least one borehole 110 may be formed using a powered tool, such as a drill 112 having a bit 114. In an embodiment, the drill 112 may be one of electric and hydraulic. In an embodiment, the drill 112 may be handheld or mounted to an arm of a machine.

In an embodiment, the diameter of the bit 114 is between one-half inch and three inches. In an embodiment, the diameter of the bit 114 is about one inch. In an embodiment, a length of the cutting surface of the bit 114 is between six inches to three feet. In an embodiment, a length of the cutting surface of the bit 114 may be about one foot, or between ten inches and fourteen inches. In an embodiment, a length of the cutting surface of the bit 114 may be about two feet.

The at least one borehole 110 may have a diameter between one-half inch and three inches. In an embodiment, the diameter of the at least one borehole 110 is one inch. A depth of the at least one borehole 110 may range from about six inches to three feet. In an embodiment, the depth of the at least one borehole 110 may be about one foot, or between ten inches and fourteen inches. In an embodiment, the depth of the at least one borehole 110 may be about two feet.

The number of boreholes 110 formed in the damaged portion 106 may depend on the size void formed by the damaged portion 106. In an embodiment, the number of boreholes 110 may range from about one to twenty, or two boreholes. In an embodiment, some of the at least one borehole 110 may undercut the surface layer 102. In an embodiment, the boreholes 110 may extend into the base material 104.

Figure 4:
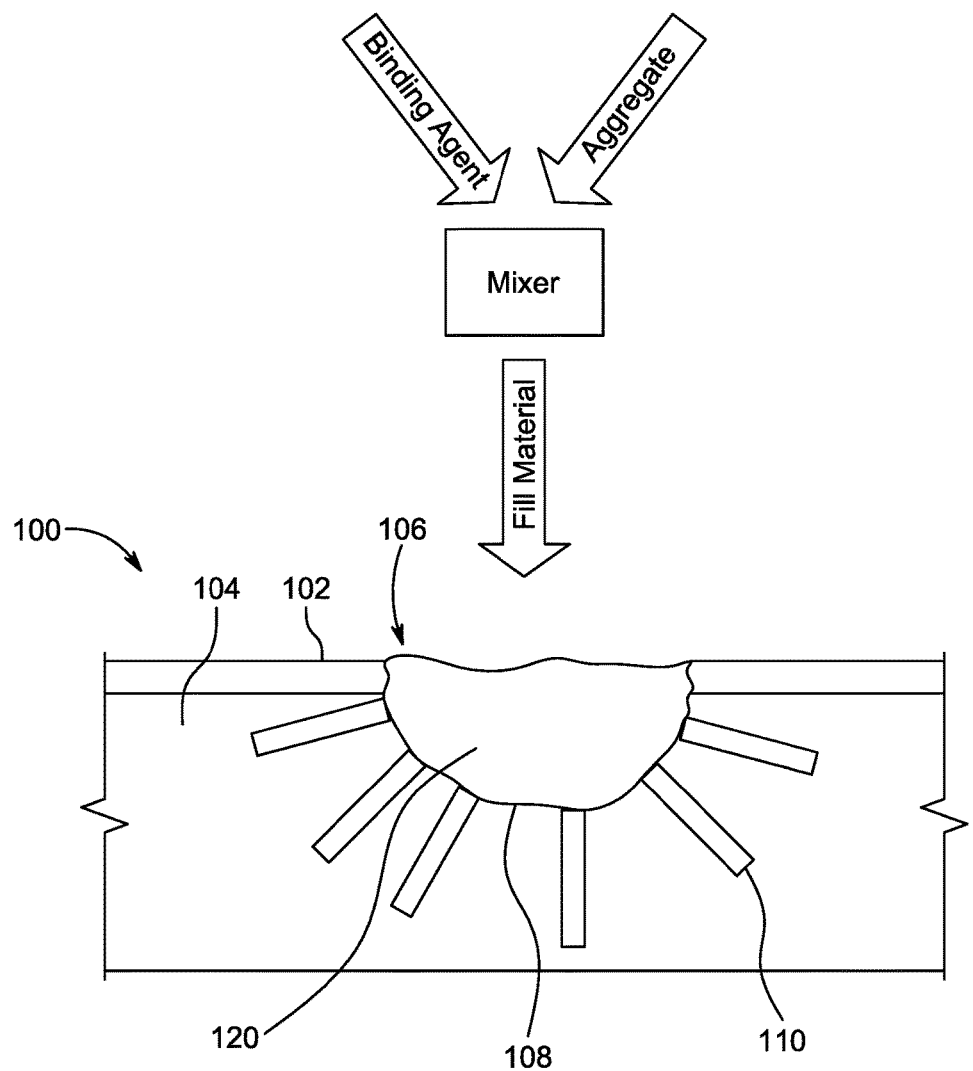
FIG. 4 depicts the pothole in FIG. 1 with the boreholes and pothole filled with a fill material.

As shown in FIG. 4, the next step for patching the damaged portion 106 is to install a fill material 120. The fill material 120 may have a consistency such that it flows into the at least one borehole 110. The fill material 120 may comprise a mixture of a binding agent and an aggregate. In an embodiment, the binding agent is a resin, such as a polymer resin. In an embodiment, the resin may be a two-part resin that includes the use of a curing agent.

In an embodiment, the aggregate is a quartz aggregate. The quartz aggregate may be washed and kiln dried. In an embodiment, each piece of the quartz aggregate may include at least six fracture faces or sides. In an embodiment, each piece of the quartz aggregate may include at least eight fracture faces or sides. It will be appreciated that the concept of "fracture faces" is similar to the sides of a dice, except that the fracture faces of the aggregate need not be uniform. The quartz aggregate may be run through a crusher in order to create the fracture faces. In an embodiment, the quartz aggregate may be a mixture of different sizes of quartz aggregate. For example, the quartz aggregate may include a mixture of #6 and #12 sized quartz aggregate. In an embodiment, the aggregate further includes sand. In an embodiment, the aggregate is ⅜ of an inch.

The resin and aggregate may be mixed in a mixer 115 having a mixing container, drum or tub. In an embodiment, the mixer 115 may include a combustion engine powered by a fuel that mixes the binding agent and aggregate. In an embodiment, the mixer 115 may include an electric motor.

In an embodiment, a carbon fiber material may be added to the fill material 120 during the mixing process to provide additional strength to the repair. In an embodiment, shredded carbon fiber material may be added to the fill material 120.

Figure 5:
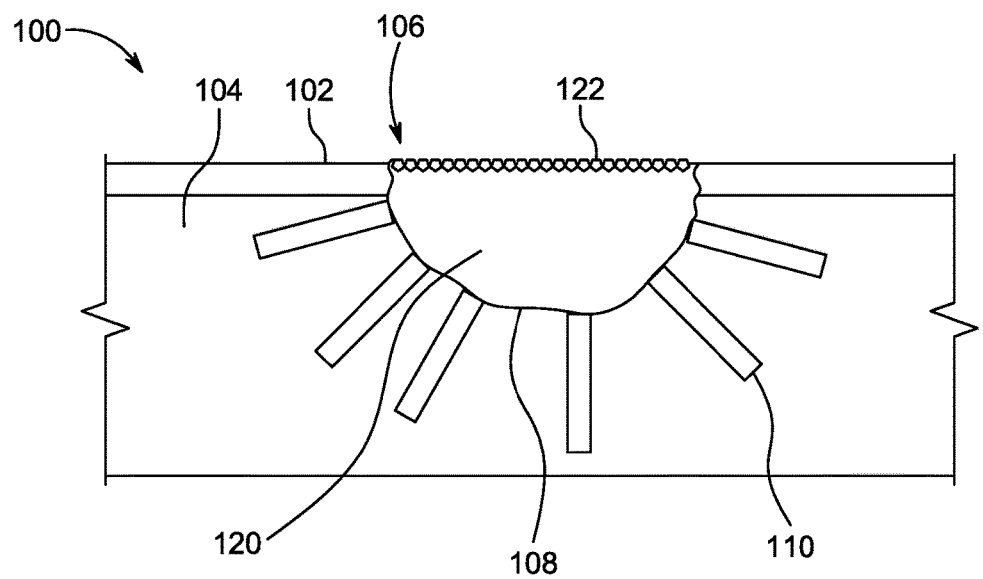
FIG. 5 depicts the pothole in FIG. 1 with the fill material and a friction enhancing material.

As shown in FIG. 4, the fill material 120 is placed into the damaged portion 106 until it is about even with the top of the surface layer 102. As shown in FIG. 5, a friction enhancing material 122 may be placed or sprinkled onto the top of the fill material 120. The friction enhancing material 122 may comprise a crushed material, such as crushed stone.

Figure 6:
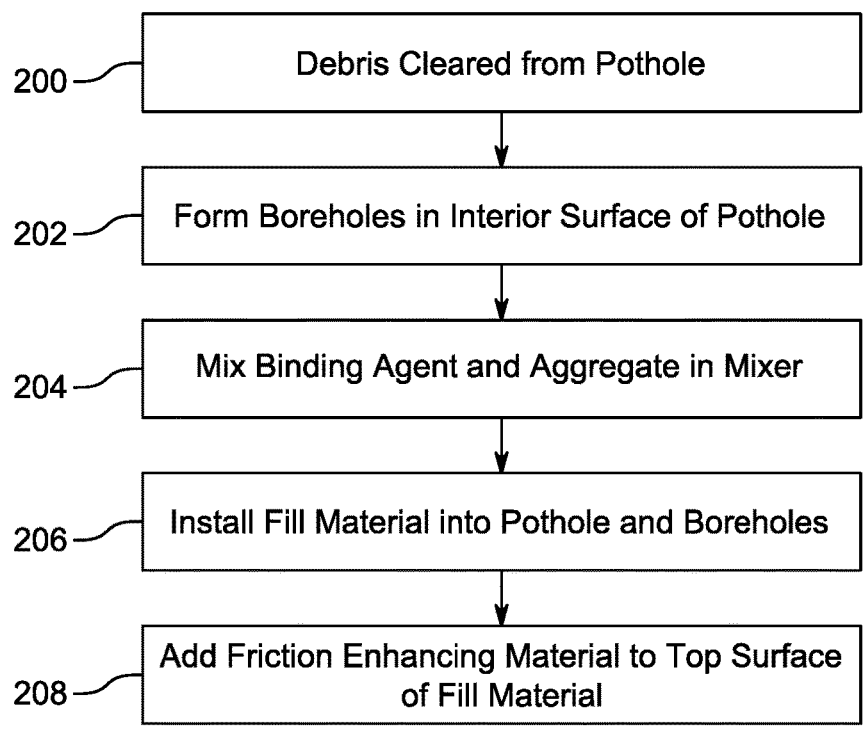
FIG. 6 is a flow chart of a process for repairing a pothole in a roadway according to an embodiment of the present disclosure.

Referring now to FIG. 6, a method of repairing a damaged portion is disclosed. At step 200, debris is cleared from the damaged portion in order to expose an interior surface of the damaged portion. At step 202, at least one borehole is formed in the interior surface of the damaged portion. The at least one borehole may have a diameter between about one half inch and three inches. In an embodiment, the at least one borehole may have a diameter of about one inch. It will be appreciated that the at least one borehole may have any diameter. The at least one borehole may be formed by a bit mounted on a drill. In an embodiment, the depth of the at least one borehole may be about two feet. It will be appreciated that at least one borehole may have any depth.

At step 204, a binding agent and an aggregate are added to a mixer. The binding agent and aggregate are mixed together to form a fill material. In an embodiment, the fill material comprises a binding agent and an aggregate mixture that are combined in the mixing container on site. In an embodiment, the binding agent and the aggregate mixture are pre-mixed offsite and transported to the site of the damaged portion.

In an embodiment, the binding agent is a resin, such as is a polymer resin. In an embodiment, the binding agent is an epoxy resin. In an embodiment, the aggregate is a quartz aggregate. The quartz aggregate may have at least six fracture faces. The quartz aggregate may have at least eight fracture faces. In an embodiment, the aggregate is a gravel aggregate. In an embodiment, the aggregate may further include sand. It will be appreciated that any type of aggregate may be utilized. In an embodiment, carbon fiber, such as shredded carbon fiber, is mixed into the fill material. Pigment may also be added to the fill material to match the color of the roadway.

In an embodiment, the fill material may be mixed by an auger mixer. The aggregate may be fed from a hopper into the auger mixer. The binding agent, such as a thermosetting resin, may be injected into the auger mixer. A curing agent or hardener (polymerization catalyst) may be injected into the auger mixer.

At step 206, the fill material is installed into the damaged portion and the at least one borehole. In an embodiment, the fill material may be poured or pumped from the mixer. A top surface of the fill material may be about even with the top of the roadway. At step 208, a friction enhancing material is placed onto the top surface of the fill material. It will be appreciated that the friction enhancing material may include a granular material, such as crushed stone, sand, or any other substance.

Figure 7:
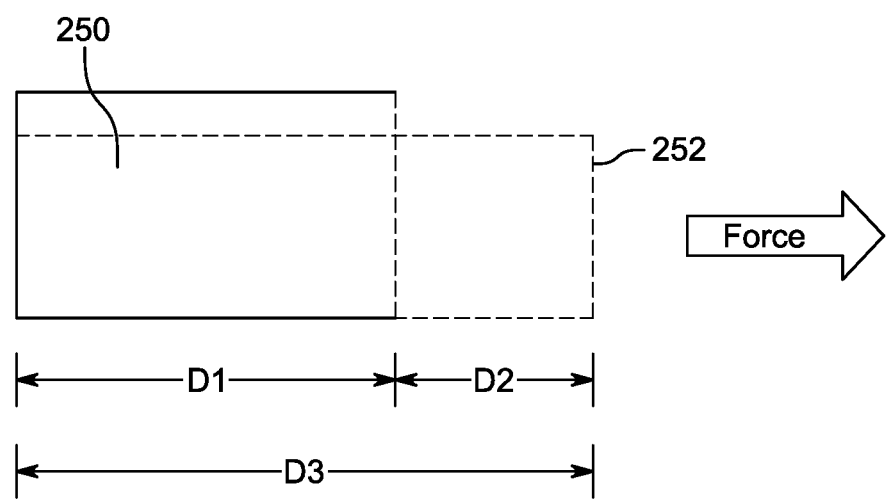
FIG. 7 depicts the deformability of the binding agent used in roadway repairs according to an embodiment of the present disclosure.

Referring now to FIG. 7, according to an embodiment of the present disclosure, a cured binding agent 250 suitable for use in the repair as described above may be deformable under tension, either plastically or elastically. It will be appreciated that the deformability of the cured binding agent 250 improves the life of the repair, especially when subject to the impact forces of vehicle traffic. The binding agent 250 may be deformed by a tension force to a new shape shown by the dashed line 252. As shown, length D1 represents the original length of the binding agent 250, length D3 represents the stretched length of the binding agent 250, and D2 is the difference between D3 and D2. When the tension force is removed, the binding agent 250 may or may not return to its original shape due to its elasticity. In some cases, the stretched binding agent will not return to its original shape as it is plastically deformable. In an embodiment, the binding agent 250 is deformable under tension to a percentage of its original length.

In an embodiment, a "percentage of deformability" is a property of the cured binding agent 250 and is defined by Equation 1, below:

$$\frac{D_3 - D_1}{D_1}$$

Where D1 is an original length of the cured binding agent and D3 is a stretched length of the cured binding agent. The percentage of deformability defined by Equation 1 represents the amount of deformation under which the binding agent 250 undergoes without failing. As used herein, the term "failure" may mean the cured binding agent 250 breaks into two pieces. For example, if the binding agent 250 is deformable under a tension force from an original length of 4 units (D1) to a length of 6 units (D3) without failure, the percentage of deformability is at least 50%. By way of another example, if the binding agent 250 is deformable under a tension force from an original length of 4 units (D1) to a length of 5 units (D3) without failure, the percentage of deformability is at least 25%.

In an embodiment, the percentage of deformability of the binding agent 250 suitable for roadway repair as described herein is at least 15%. In an embodiment, the percentage of deformability of the binding agent 250 suitable for roadway repair as described herein is at least 20%. In an embodiment, the percentage of deformability of the binding agent 250 suitable for roadway repair as described herein is at least 25%. In an embodiment, the percentage of deformability of the binding agent 250 suitable for roadway repair as described herein is at least 30%. In an embodiment, the percentage of deformability of the binding agent 250 suitable for roadway repair as described herein is at least 35%. In an embodiment, the percentage of deformability of the binding agent 250 suitable for roadway repair as described herein is at least 40%. In an embodiment, the percentage of deformability of the binding agent 250 suitable for roadway repair as described herein is at least 45%. In an embodiment, the percentage of deformability of the binding agent 250 suitable for roadway repair as described herein is at least 50%. In an embodiment, the percentage of deformability is between 15% and 50%. It will be appreciated that the binding agent 250 may be a polymer resin suitable for use in roadway repair as described above.

Figure 8A:
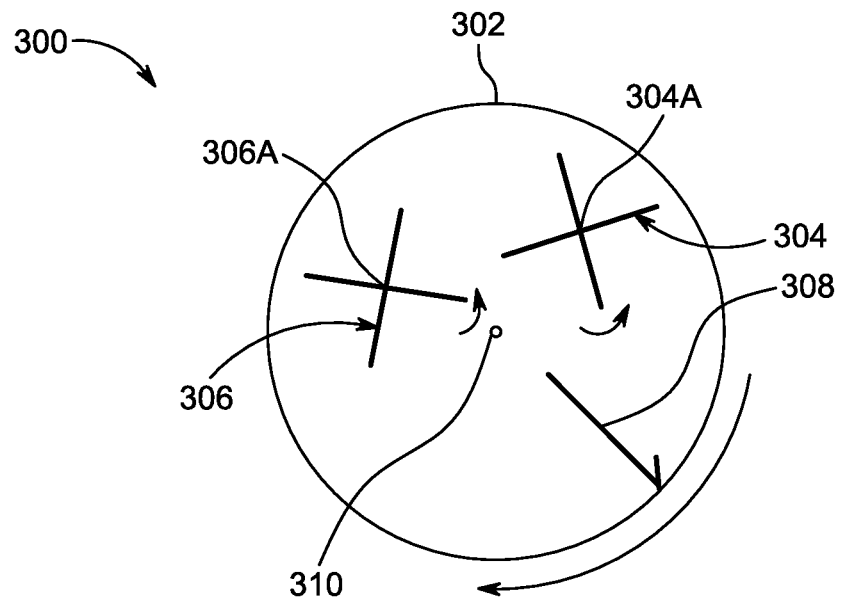
FIGS. 8A-8C depict a mixer for a binding agent and an aggregate according to an embodiment of the present disclosure.
Figure 8B:
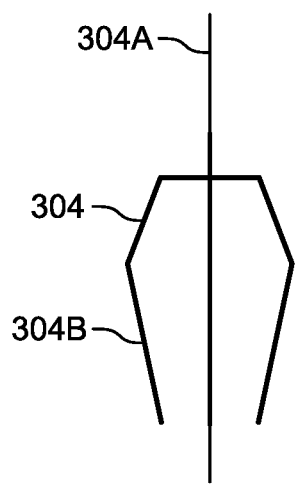
Figure 8C:
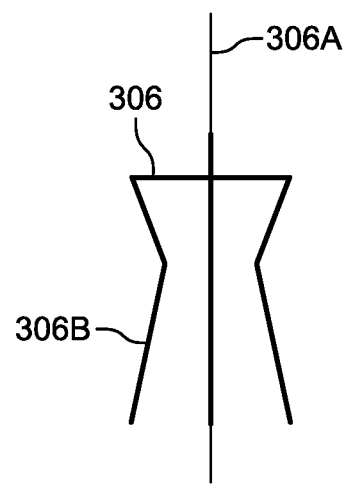

Referring now to FIGS. 8A, 8B and 8C, there is depicted an exemplary embodiment of a mixer 300 suitable for use with the present disclosure. The mixer 300 may be utilized to mix a binding agent and aggregate as disclosed herein. The mixer 300 may include a mixing tub 302. The mixer 300 may further include a first mixing blade assembly 304 and a second mixing blade assembly 306. The mixer 300 may further include a scraper 308.

The first mixing blade assembly 304 may rotate about a first axis 304A and the second mixing blade assembly 306 may rotate about a third axis 306A. In addition, the first mixing blade assembly 304 and the second mixing blade assembly 306 and the scraper may rotate about a second axis 310. It will be appreciated that the first mixing blade assembly 304 may include a plurality of blades 304B and the second mixing blade assembly 306 may include a plurality of blades 306B.

As previously mentioned, in an embodiment, the fill material may comprise a polymer resin and a quartz aggregate. It is theorized that the bonds between the polymer resin and the quartz aggregate may form simplicial complexes. (Simplicial complex, in which context the word "simplex" simply means any finite set of vertices.) In this regard, a regular simplex may be constructed by connecting a new vertex to all original vertices by the common edge length. The associated combinatorial structure is called an abstract. In algebraic, simplex are used as building blocks to construct an interesting class of topological spaces called simplicial complexes. These spaces are built from simplices glued together in a combinatorial fashion.

It will be appreciated that the use of the boreholes in the interior surface of the damaged portions, as described herein, provide a more secure patch that is able to withstand traffic as well as inclement weather. In particular, the fill material in the boreholes provides an anchor for the main portion of the pothole patch. The present disclosure may be utilized with both asphalt and concrete roadways.

A method of repairing a damaged portion of a roadway according to an embodiment of the present disclosure, the damaged portion having an interior surface and the roadway having a surface layer, comprises: forming at least one borehole in the interior surface of the damaged portion; and installing a fill material into the damaged portion such that the fill material fills the at least one borehole and the damaged portion. The method may further include wherein the fill material comprises a binding agent and an aggregate. The method may further include wherein the binding agent is a polymer resin. The method may further include wherein the binding agent, when cured, has a percentage of deformability of at least 15%. The method may further include wherein the binding agent, when cured, has a percentage of deformability of at least 25%. The method may further include wherein the binding agent, when cured, has a percentage of deformability of at least 35%. The method may further include wherein the binding agent, when cured, has a percentage of deformability of at least 50%. The method may further include wherein the aggregate is a crushed quartz aggregate having at least six fracture faces. The method may further include wherein the aggregate is a crushed quartz aggregate having eight fracture faces. The method may further include wherein a diameter of the at least one borehole is between one half inch and three inches, or about one inch. The method may further include wherein a length of the at least one borehole is between about six inches and three feet, or about two feet. The method may further include forming the at least one borehole comprises using a drill and a bit. The method may further include wherein the at least one borehole extends beneath the surface layer of the roadway. The method may further include wherein the surface layer of the roadway is formed of one of asphalt and concrete. The method may further include wherein the fill material comprises carbon fiber. The method may further include mixing the fill material in a powered mixer prior to installation. The method may further include wherein the powered mixer comprises a tub having a first mixing blade assembly and a second mixing blade assembly and a sidewall scrapper. The method may further include wherein the at least one borehole comprises two boreholes. The method may further include wherein the at least one borehole comprises more than two boreholes. The method may further include wherein the roadway is one of a road, a highway, a freeway, a pathway, a parking lot, a runway, and a footpath.

A method of repairing a damaged portion formed in a roadway according to an embodiment comprises: installing a fill material into the damaged portion; and allowing the fill material to cure; wherein the fill material comprises a binding agent and an aggregate; wherein each piece of the aggregate comprises at least six fracture faces. The method may further include wherein each piece of the aggregate comprises at least eight fracture faces. The method may further include the aggregate is a quartz aggregate. The method may further include wherein the aggregate is pre-washed and kiln dried. The method may further include wherein the aggregate is about ⅜ of an inch. The method may further include wherein the binding agent is a polymer resin.

Figure 10:
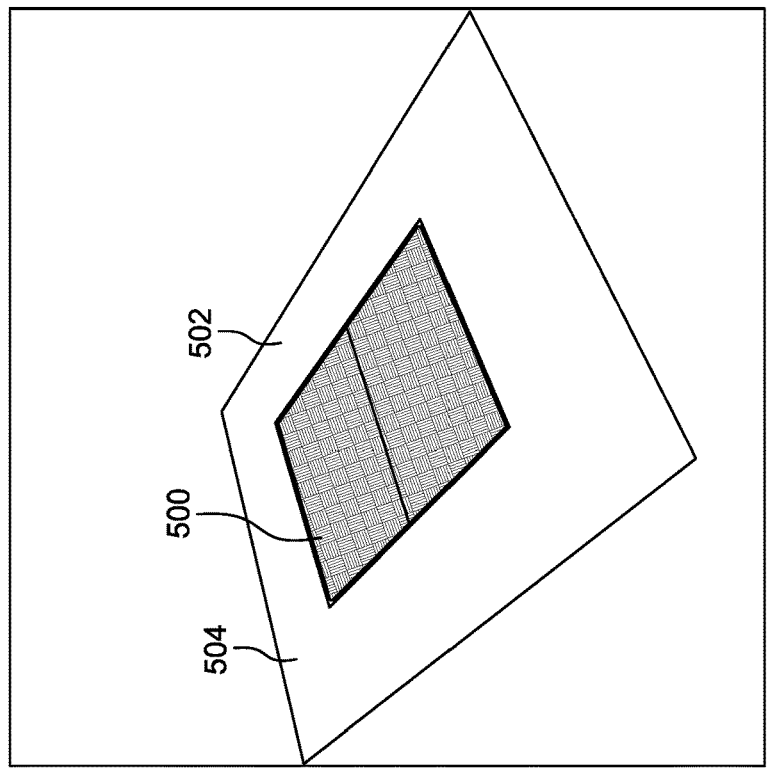
FIG. 10 shows the concrete apron in FIG. 9 after repairs according to an embodiment of the present disclosure.
Figure 9:
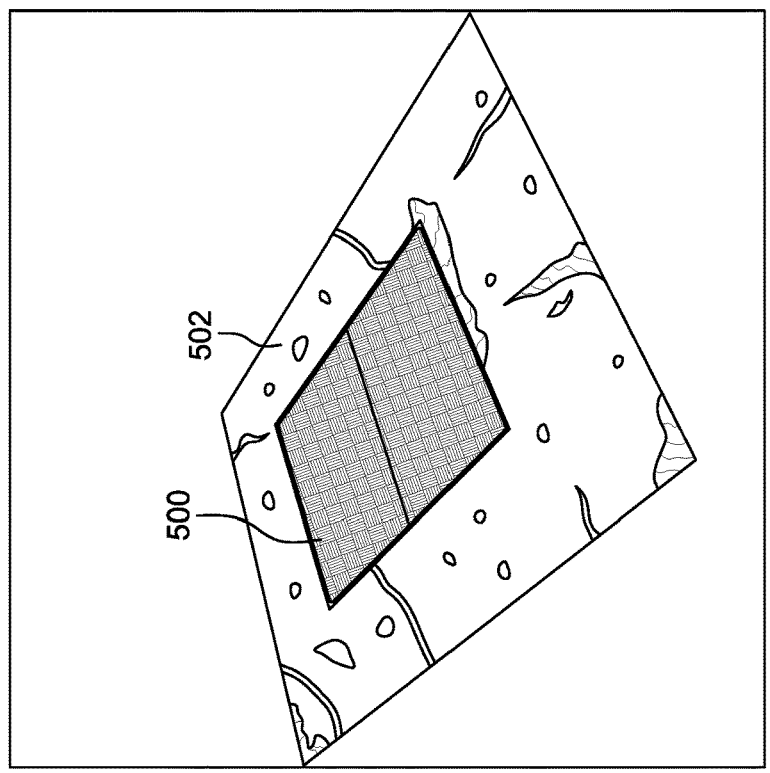
FIG. 9 shows a metal cover installed over an access tunnel and having a damaged concrete apron.
Figure 21:
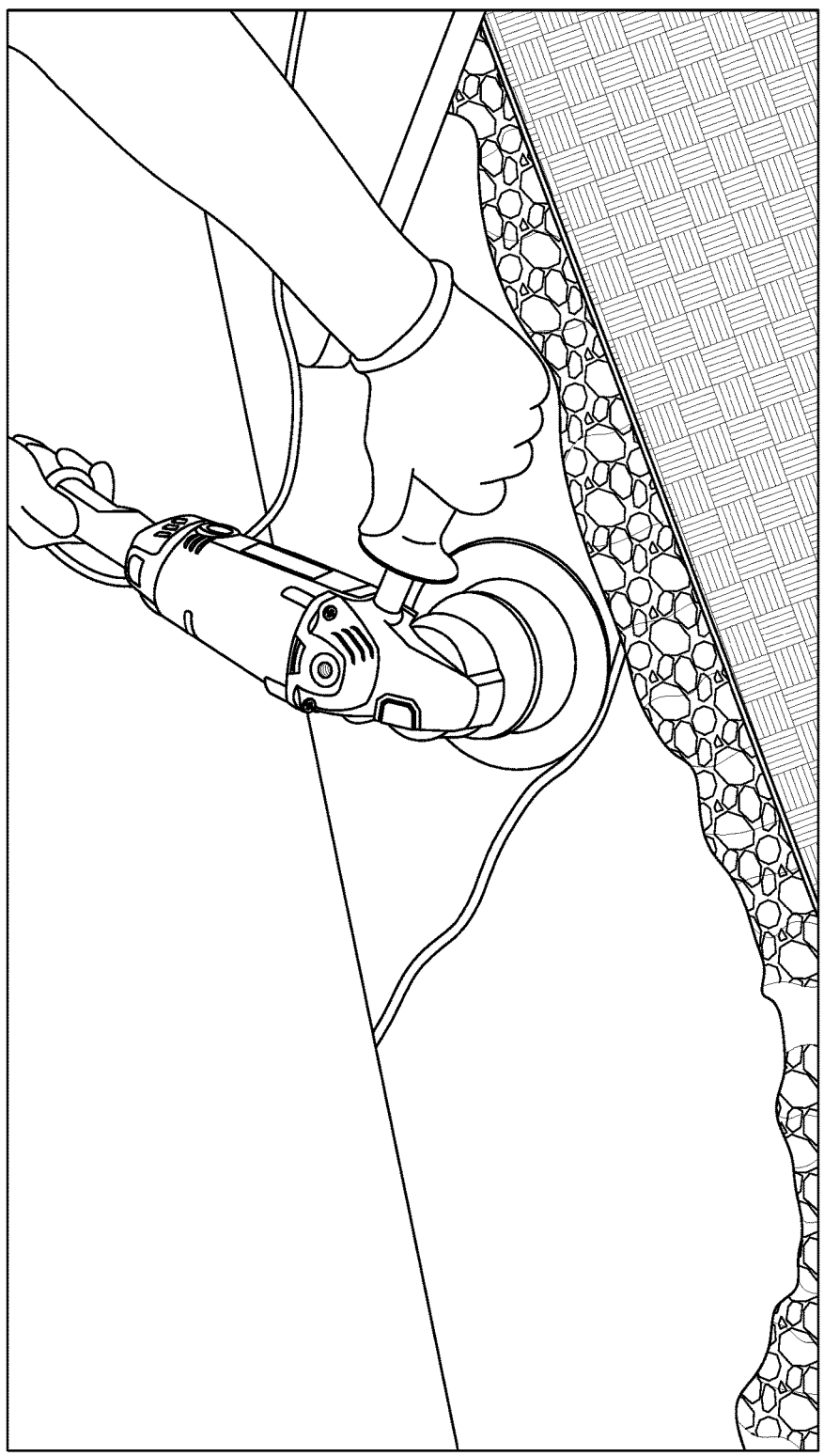
FIG. 21 depicts a process for preparing a damaged surface for repair according to an embodiment of the present disclosure.
Figure 22:
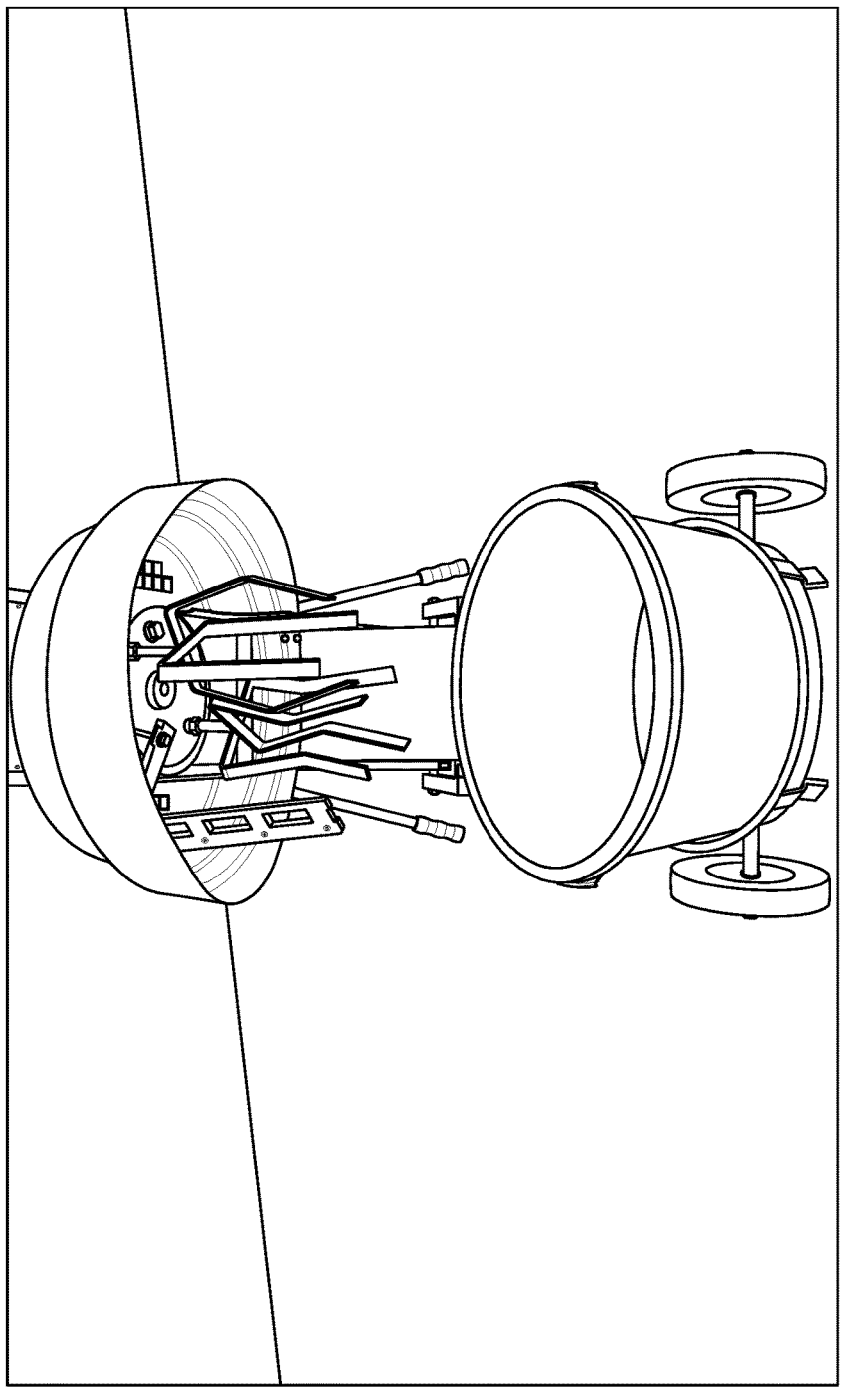
FIG. 22 depicts a mixer for use in mixing resin and aggregate utilized in surface repair according to an embodiment of the present disclosure.
Figure 23:
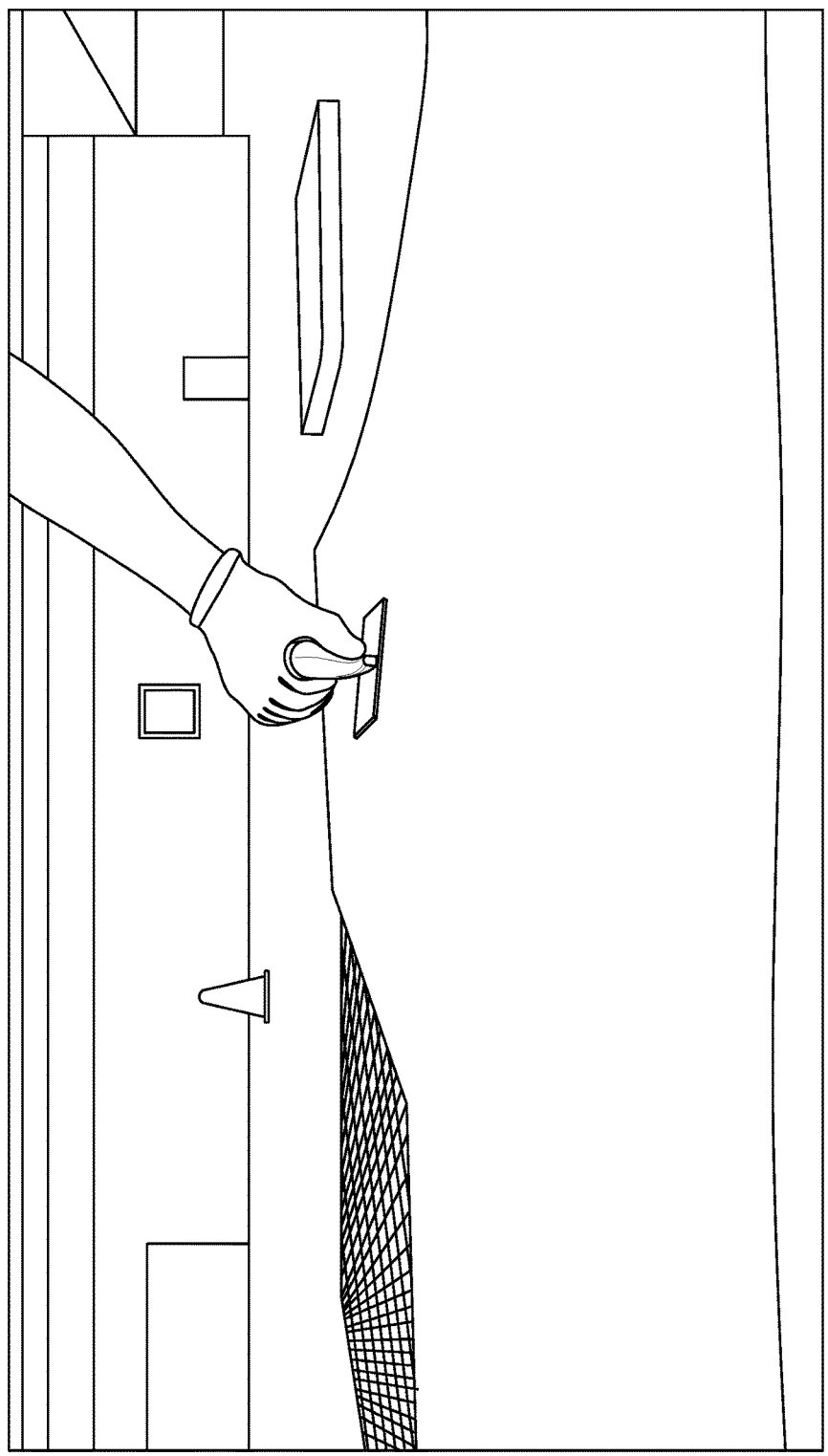
FIG. 23 depicts a process for finishing a repair to a damaged surface according to an embodiment of the present disclosure.

Referring now to FIG. 9, there is depicted a metal cover 500 installed over a utility access tunnel. Surrounding the cover 500 is a concrete apron 502. As can be seen, the apron 502 is damaged and includes cracks, pits and voids. A process of repairing the apron 502 is as follows. First, the apron 502 is cleared of debris. Next, as shown in FIG. 21, a grinder is used to remove rough edges and loose edges on the apron 502. Next, a protective overlay and composite material 504 is installed onto the apron 502 to effectuate the repair. In an embodiment, the protective overlay material 504 is mixed in a mixer as shown in FIG. 22 and then placed onto the damaged surface of the apron 502. The material 504 is then finished by using a hand trowel as shown in FIG. 23. The repaired apron 502 is shown in FIG. 10.

Figure 12:
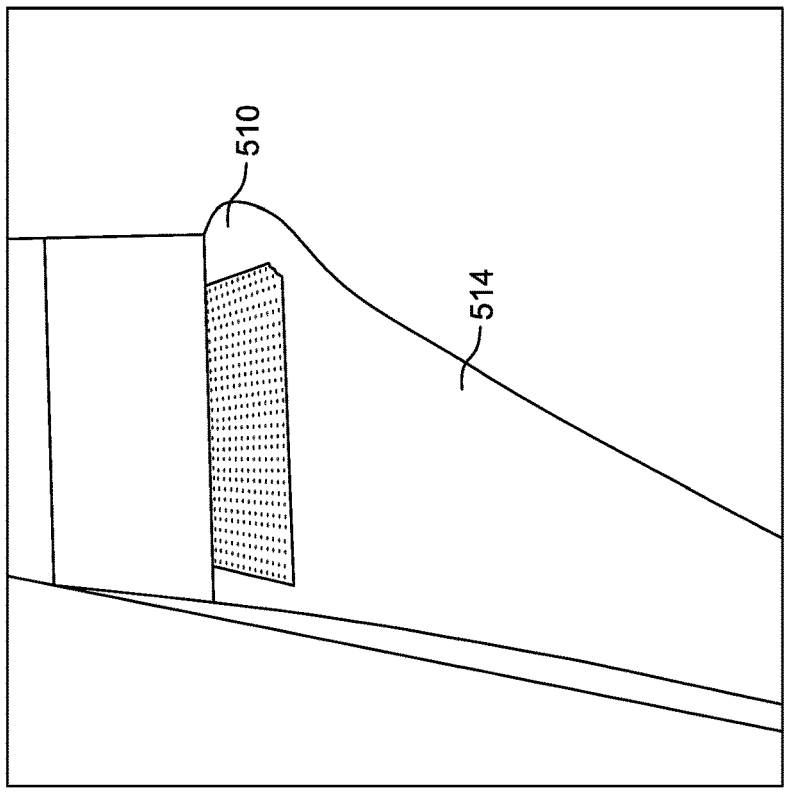
FIG. 12 shows the pedestrian ramp in FIG. 11 after repairs according to an embodiment of the present disclosure.
Figure 11:
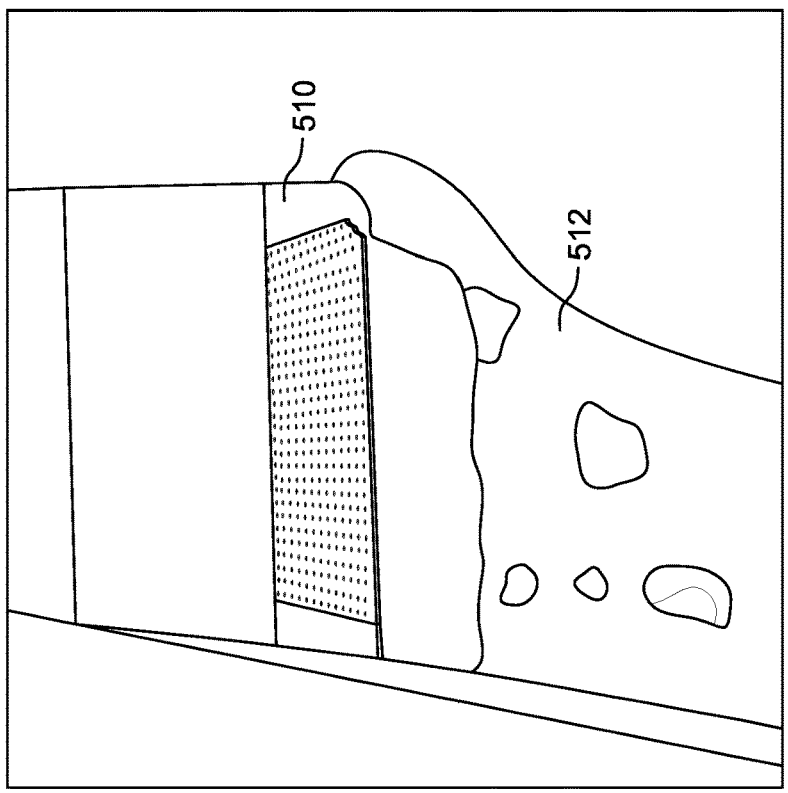
FIG. 11 shows a damaged pedestrian ramp.

Referring now to FIG. 11, there is depicted a concrete pedestrian ramp 510 having a damaged surface 512. The damage to the surface 512 includes cracks, pits and voids. A process of repairing the surface 512 is as follows. First, the surface 512 is cleared of debris. Next, as shown in FIG. 21, a grinder is used to remove rough edges and loose edges on the surface 512. Next, a protective overlay and composite material 514 is installed onto the surface 512 to effectuate the repair. In an embodiment, the protective overlay material 514 is mixed in a mixer as shown in FIG. 22 and then placed onto the damaged surface of the surface 512. The material 514 is then finished by using a hand trowel as shown in FIG. 23. The repaired ramp 510 is shown in FIG. 12.

Figure 14:
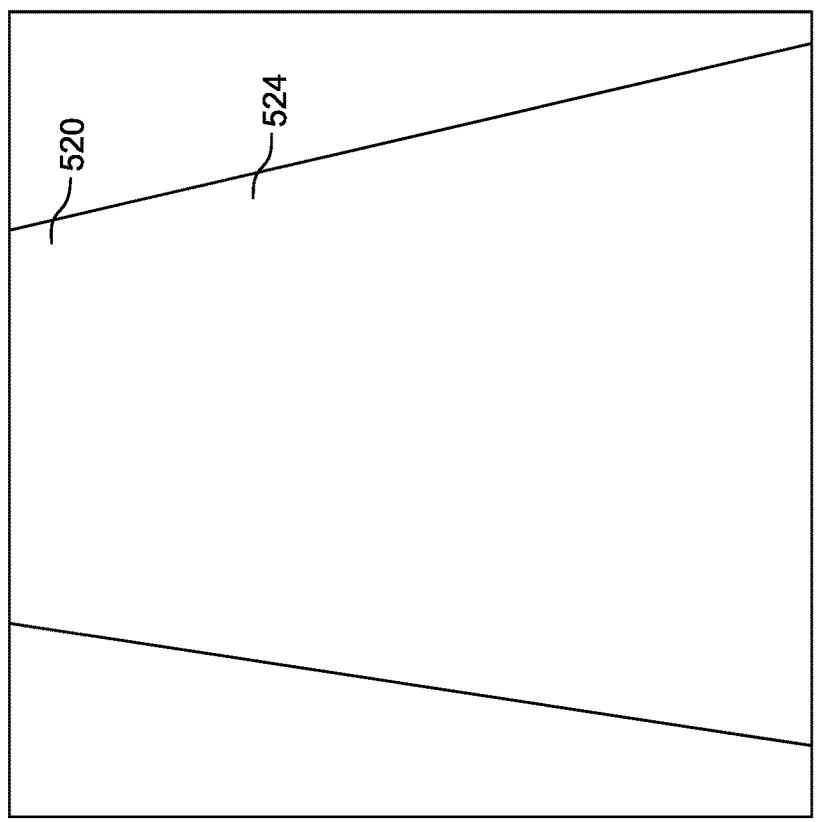
FIG. 14 depicts the concrete water trough in FIG. 13 after repairs according to an embodiment of the present disclosure.
Figure 13:
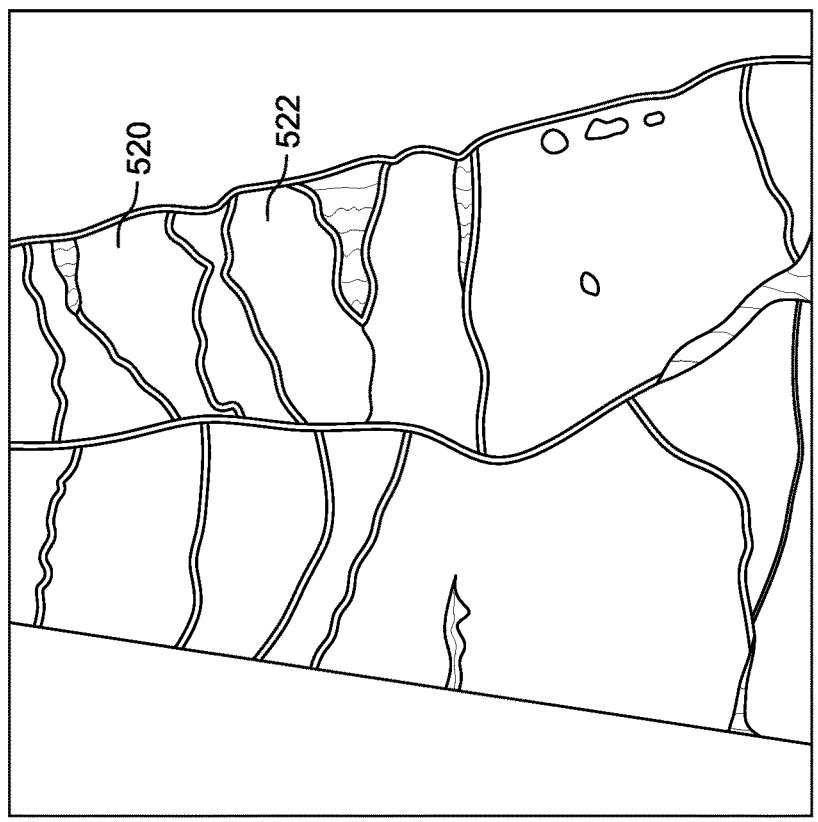
FIG. 13 depicts a damaged concrete water trough formed in a roadway.

Referring now to FIG. 13, there is depicted a concrete trough 520 having a damaged surface 522. The damage to the surface 522 includes cracks, pits and voids. A process of repairing the surface 522 is as follows. First, the surface 522 is cleared of debris. Next, as shown in FIG. 21, a grinder is used to remove rough edges and loose edges on the surface 522. Next, a protective overlay and composite material 524 is installed onto the surface 522 to effectuate the repair. In an embodiment, the protective overlay material 524 is mixed in a mixer as shown in FIG. 22 and then placed onto the damaged surface of the surface 522. The material 524 is then finished by using a hand trowel as shown in FIG. 23. The repaired trough 520 is shown in FIG. 14.

Figure 16:
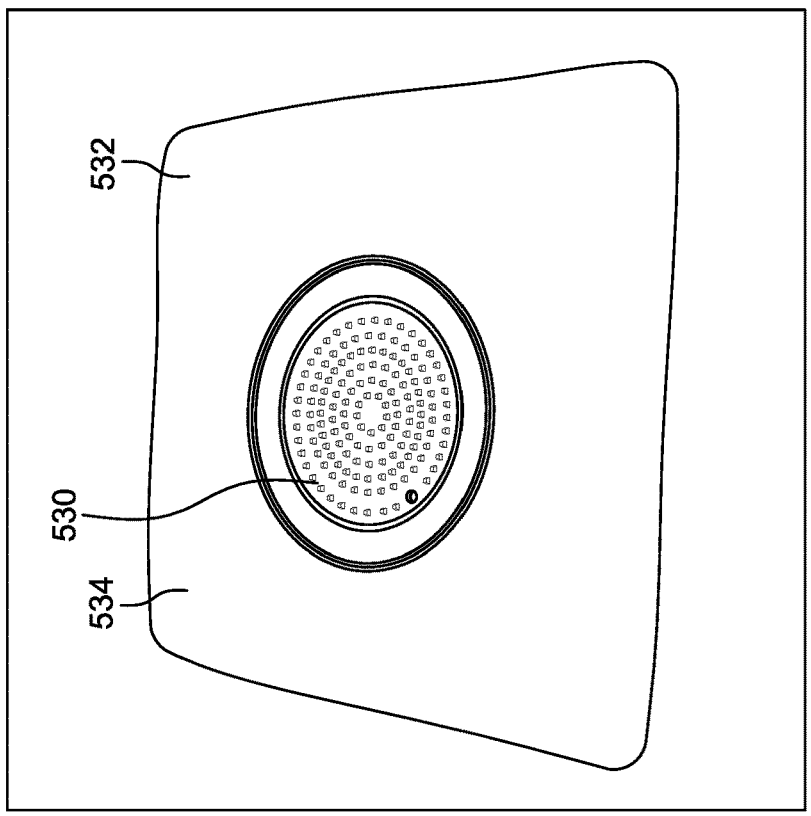
FIG. 16 shows the concrete apron in FIG. 15 after repairs according to an embodiment of the present disclosure.
Figure 15:
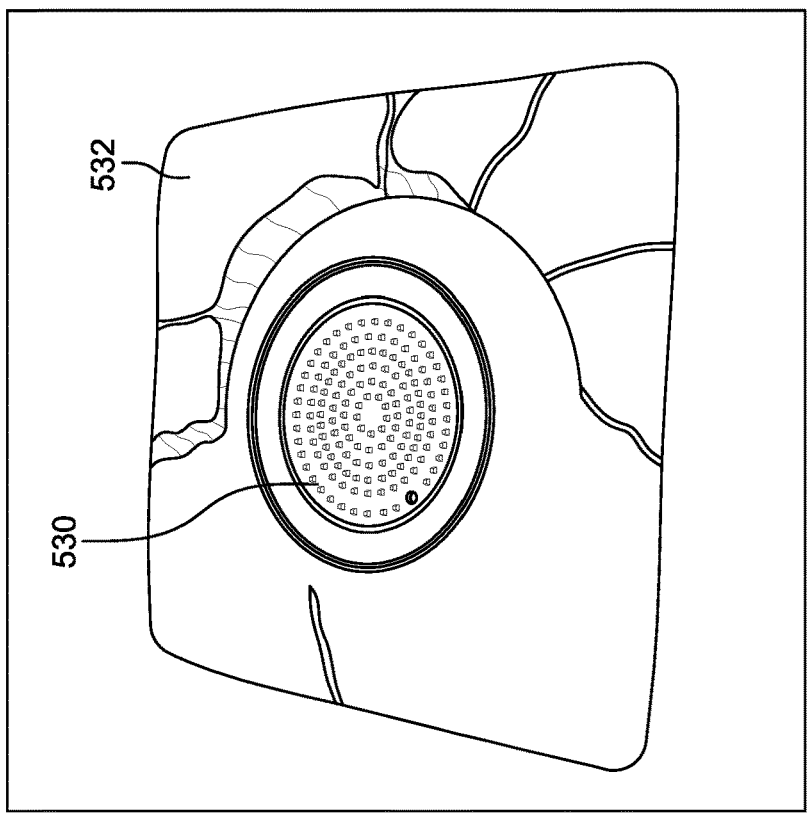
FIG. 15 shows a metal cover manhole cover installed over an access tunnel and having a damaged concrete apron.

Referring now to FIG. 15, there is depicted a manhole cover 530 installed over a utility access tunnel. Surrounding the cover 530 is a concrete apron 532. As can be seen, the apron 532 is damaged and includes cracks, pits and voids. A process of repairing the apron 532 is as follows. First, the apron 532 is cleared of debris. Next, as shown in FIG. 21, a grinder is used to remove rough edges and loose edges on the apron 532. Next, a protective overlay and composite material 534 is installed onto the apron 532 to effectuate the repair. In an embodiment, the protective overlay material 534 is mixed in a mixer as shown in FIG. 22 and then placed onto the damaged surface of the apron 532. The material 534 is then finished by using a hand trowel as shown in FIG. 23. The repaired apron 532 is shown in FIG. 16.

Figure 18:
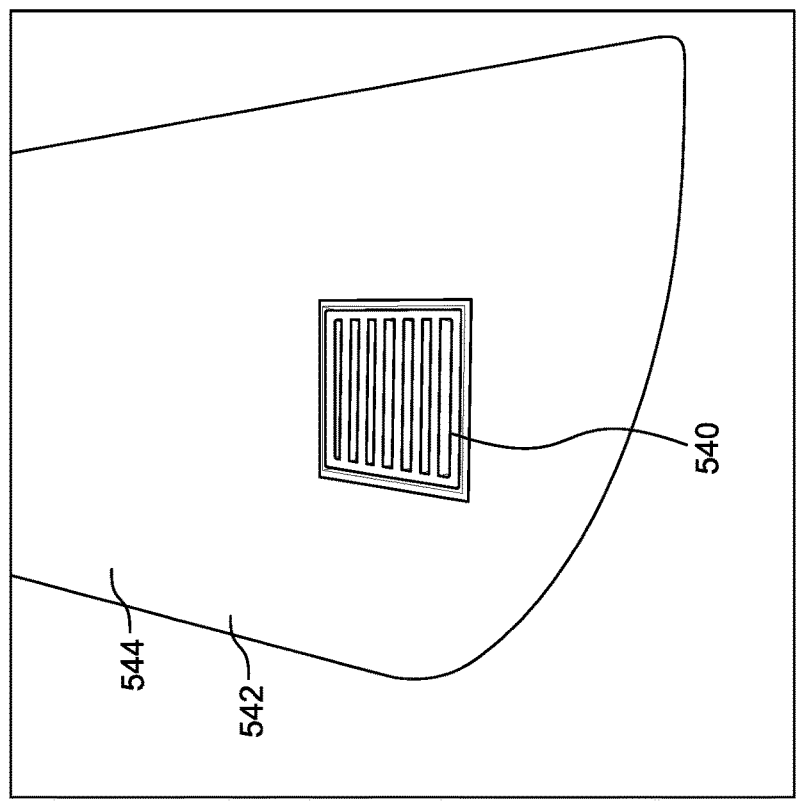
FIG. 18 shows the concrete apron in FIG. 17 after repairs according to an embodiment of the present disclosure.
Figure 17:
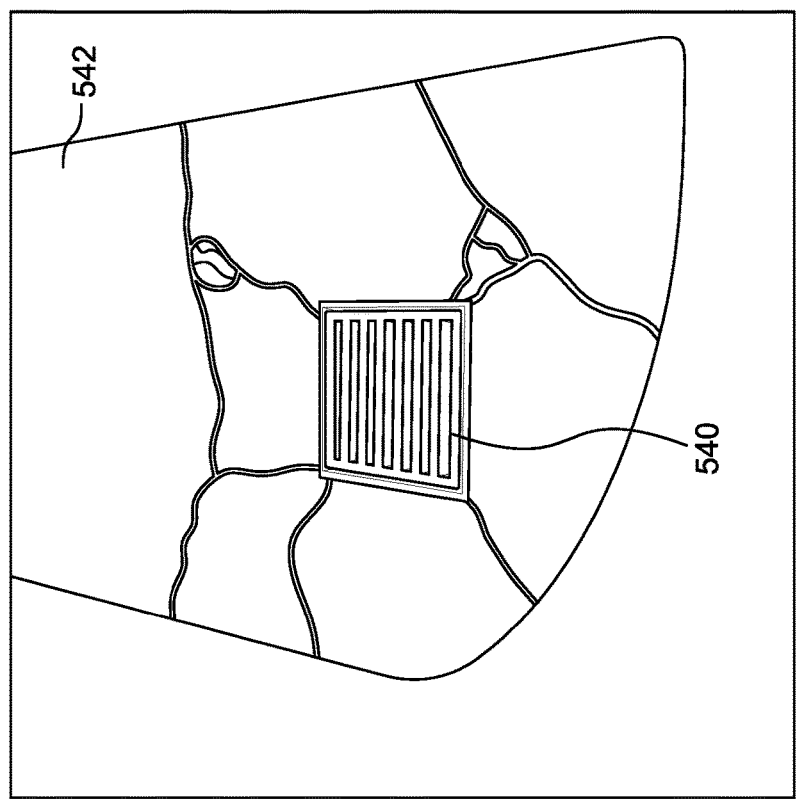
FIG. 17 depicts a metal grate in a roadway having a damaged concrete apron.

Referring now to FIG. 17, there is depicted a metal grate 540 installed over a drain pipe. Surrounding the grate 540 is a concrete trough 542. As can be seen, the trough 542 is damaged and includes cracks, pits and voids. A process of repairing the trough 542 is as follows. First, the trough 542 is cleared of debris. Next, as shown in FIG. 21, a grinder is used to remove rough edges and loose edges on the trough 542. Next, a protective overlay material 544 is installed onto the trough 542 to effectuate the repair. In an embodiment, the protective overlay material 544 is mixed in a mixer as shown in FIG. 22 and then placed onto the damaged surface of the trough 542. The material 544 is then finished by using a hand trowel as shown in FIG. 23. The repaired trough 542 is shown in FIG. 18.

Figure 20:
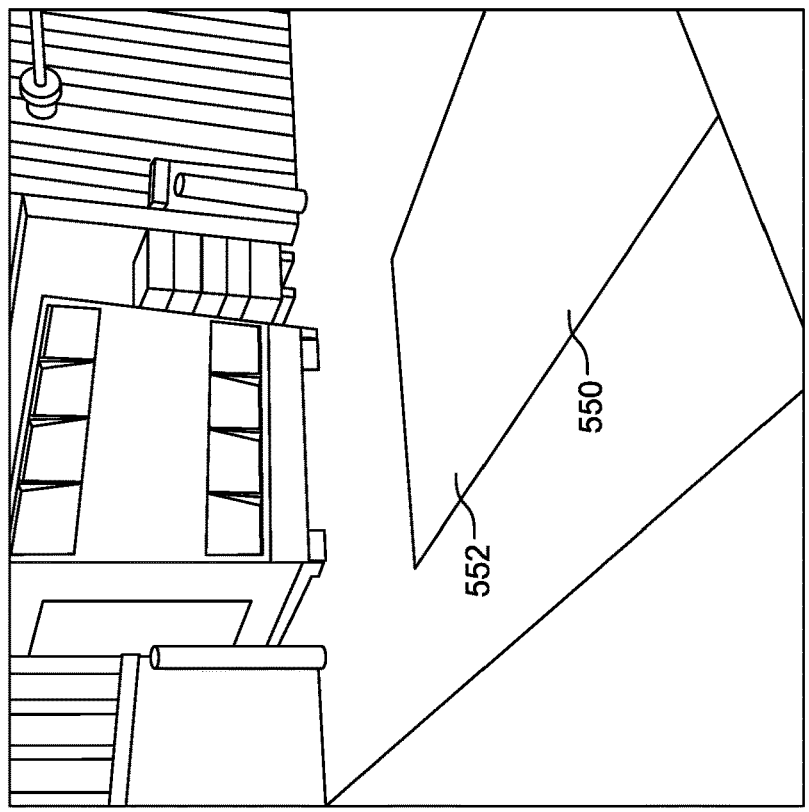
FIG. 20 depicts the surface in FIG. 19 after repairs according to an embodiment of the present disclosure.
Figure 19:
FIG. 19 depicts a damaged surface.

Referring now to FIG. 19, there is depicted a concrete pad 550. As can be seen, the pad 550 is damaged and includes cracks, pits and voids. A process of repairing the pad 550 is as follows. First, the pad 550 is cleared of debris. Next, as shown in FIG. 21, a grinder is used to remove rough edges and loose edges on the pad 550. Next, a protective overlay and composite material 552 is installed onto the pad 550 to effectuate the repair. In an embodiment, the protective overlay material 552 is mixed in a mixer as shown in FIG. 22 and then placed onto the damaged surface of the pad 550. The material 552 is then finished by using a hand trowel as shown in FIG. 23. The repaired pad 550 is shown in FIG. 20.

Figure 24:
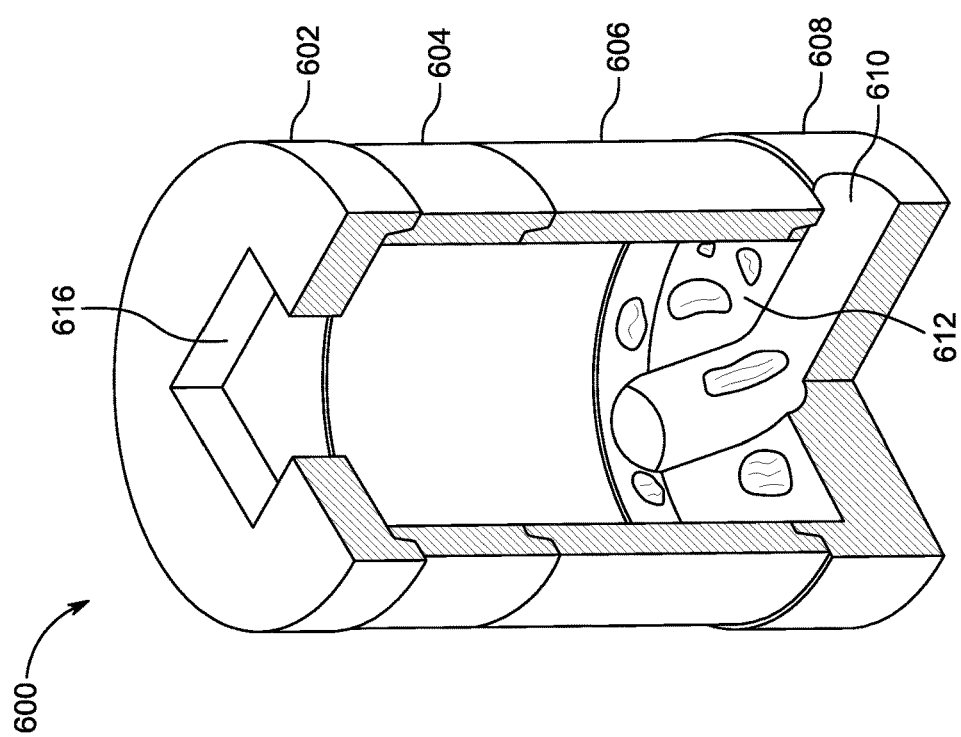
FIG. 24 depicts a manhole assembly having a damaged inner surface.

Referring now to FIG. 24, there is depicted a manhole vault assembly 600. The assembly 600 comprises a cap 602, mid-risers 604 and 606, and a base member 608. In an embodiment, the manhole vault assembly 600 is formed of concrete. The assembly 600 may be buried underground and provide access to a sewage system through an opening formed in the cap 602. In particular, the base member 608 may include a trough 610 for directing sewage as is known to one having ordinary skill in the art. As can be observed, an inner surface 612 of the base member 608 may include damaged portions in the nature of pitting and corrosion caused by the toxic sewer gases.

Figure 25:
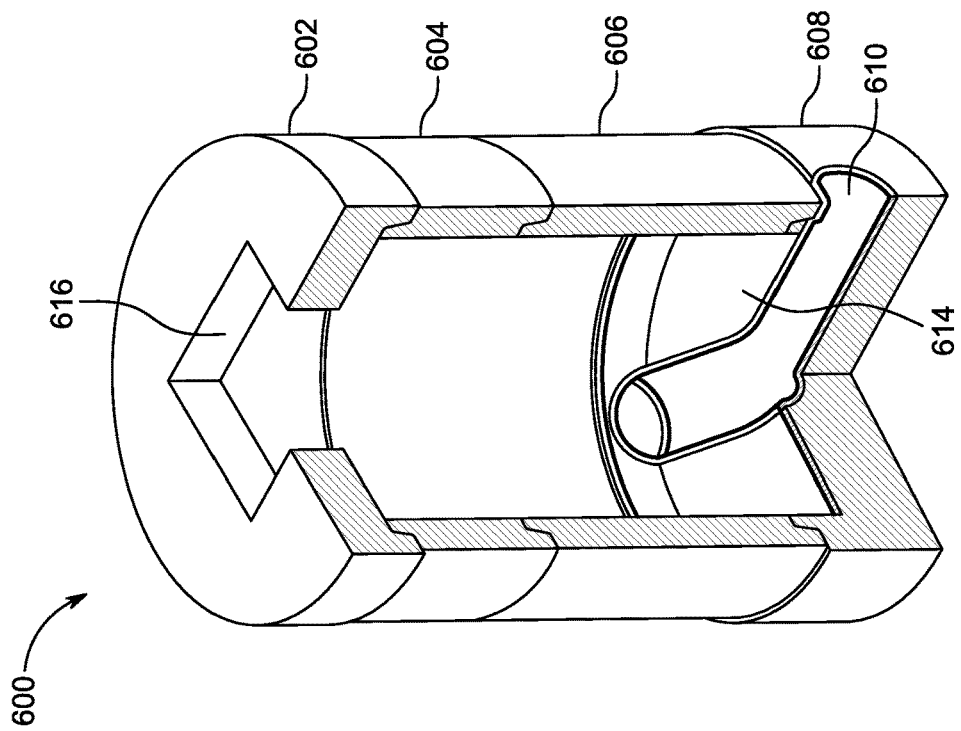
FIG. 25 depicts the manhole assembly of FIG. 24 after repairs according to an embodiment of the present disclosure.

A process of repairing the inner surface 612 of the base member 608 is as follows. First, the inner surface 612 is cleared of debris. Next, as illustratively shown in FIG. 21, a grinder is used to remove rough edges and loose edges on the inner surface 612. Next, a protective overlay and composite material 614 is installed onto the inner surface 612 to effectuate the repair. In an embodiment, the protective overlay material 614 is mixed in a mixer as shown in FIG. 22 and then placed onto the inner surface 612. The material 614 is then finished by using a hand trowel as illustratively shown in FIG. 23. The repaired inner surface of the base member 608 is shown in FIG. 25.

The composite material used as a protective overlay for protecting and repairing surfaces may be pre-mixed in batches. In an embodiment, the composite material may be a two-part resin (parts A and B) that have the following formulation as shown in Table 1.

TABLE 1

| POLYMER COMPOSITE | |
|---|---|
| Ingredient | Embodiment #1 |
| Part A | |
| Resin | 84 fluid oz |
| Fumed Silica | 216 fluid oz |
| #90 Cal Silica Sand | 24 fluid oz |
| Fly Ash | 12 fluid oz |
| Part B | |
| Hardener | 12 fluid oz |
| Fumed Silica | 48 fluid oz |
| Mix instructions: Combine all in forced induction mixer for mixing time of 3-5 minutes. | |

As can be observed in Table 1, in an embodiment of the present disclosure, a ratio of resin to fumed silica by volume is 14:41; a ratio of resin to sand by volume is 7:2; and a ratio of resin to fly ash by volume is 7:1. In an embodiment of the present disclosure, the foregoing ratios are variable by +/−10% or +/−15%.

In an embodiment, the composite material may be a two-part composite material with a paintable finish and may have the formulation as shown in Table 2.

TABLE 2

| POLYMER COMPOSITE (Paintable) | |
|---|---|
| Ingredient | Embodiment #1 (by volume) |
| Part A | |
| Resin | 96 fluid oz |
| Fumed Silica | 72 fluid oz |
| Fly Ash | 12 fluid oz |
| Part B | |
| Hardening Agent | 12 fluid oz |
| Mix instructions: Combine all in forced induction mixer for mixing time of 3-5 minutes. | |

As can be observed in Table 2, in an embodiment of the present disclosure, a ratio of resin to fumed silica by volume is 4:3; and a ratio of resin to fly ash by volume is 8:1. In an embodiment of the present disclosure, the foregoing ratios are variable by +/−10% or +/−15%.

In an embodiment, the composite material may be a two-part composite material for use in quick set applications may have the following formulation as shown in Table 3.

TABLE 3

(Hybrid composite)

| Ingredient | Embodiment #1 |
|---|---|
| Part A | |
| Resin | 96 fluid oz |
| #12 Sleeve Aggregate (washed and dried With 6 fracture faces) | 100 lbs. |
| 490 Sleeve Sand (washed and dried) | 20 lbs. |
| Fly Ash (cenoshere) | 5 lbs. |
| Part B | |
| Hardening Agent | 20 fluid oz. |
| Mix instructions: Combine all in forced induction mixer for mixing time of 3-5 minutes. | |

As can be observed in Table 3, in an embodiment of the present disclosure, a ratio of resin to fly ash by volume to weight is 96:5. In an embodiment of the present disclosure, the foregoing ratio is variable by +/−10% or +/−15%.

The two-part compositions of the present disclosure may include a part A and a part B. Parts A and B are typically mixed on-site just prior to installation. Mixing parts A and B causes a reaction which starts the curing process. Part A is referred to herein as the resin and part B is referred to as the hardening agent. The two-part composition is applied to a damaged surface while it is still a liquid. Once applied over a surface, the composite material cures until hard. In an embodiment, the resin utilized herein may be a polymer resin.

It will be appreciated that embodiments of the present invention provide an improved concrete repair technology that is able to repair foundations, road, curbs, speed bumps, parking lots, concrete pads, driveways, sidewalks, and other concrete structures. It will be further appreciated that repairs using the formulations disclosed herein may be up to four times stronger than traditional concrete. It will be further appreciated that embodiments of the present disclosure may reduce repair time to 30 minutes and significantly reduce repair costs as compared to traditional repair methods. Moreover, embodiments of the present disclosure allow repairs to be performed year-round—in both hot and cold weather.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A method of repairing a damaged surface, said method comprising:
   removing any loose debris from the surface; and
   applying a protective overlay on the surface;
   wherein the protective overlay comprises a composition of a polymer resin and fly ash;
   wherein a ratio of the polymer resin to fly ash by volume is 7:1 plus or minus 15%.

2. The method of claim 1, wherein the composition further comprises fumed silica; wherein a ratio of the resin to fumed silica by volume is 14:41 plus or minus 15%.

3. The method of claim 2, further comprising mixing the composition in a mixer.

4. The method of claim 1, wherein the composition further comprises a hardening agent.

5. The method of claim 1, wherein the composition further comprises sand.

6. The method of claim 1, wherein in the surface is formed of cement.

7. The method of claim 1, further comprising painting the protective overlay after it has cured.

8. A method of repairing a damaged surface, said method comprising:
   removing any loose debris from the surface; and
   applying a protective overlay on the surface;
   wherein the protective overlay consists of a composition of a polymer resin, fumed silica, sand, fly ash, and a hardener.

9. The method of claim 8, wherein a ratio of the polymer resin to the fly ash by volume is 7:1 plus or minus 15%.

10. The method of claim 9, further comprising mixing the composition in a mixer.

11. The method of claim 9, wherein wherein a ratio of resin to sand by volume is 7:2 plus or minus 15%.

12. The method of claim 8, wherein a ratio by volume of the polymer resin to fumed silica is 84:216.

13. A composition for repairing a surface consisting of:
   a polymer resin;
   fumed silica;
   sand;
   a hardener; and
   fly ash.

14. The composition of claim 13, wherein a ratio of the polymer resin to fly ash by volume is 7:1 plus or minus 15%.

15. The composition of claim 13, wherein a ratio of the polymer resin to sand by volume is 7:2 plus or minus 15%.

16. The composition of claim 13, wherein a ratio of the polymer resin to fumed silica is 84:216.

* * * * *